(12) United States Patent
Nakayama et al.

(10) Patent No.: US 8,564,735 B2
(45) Date of Patent: Oct. 22, 2013

(54) LIQUID CRYSTAL DISPLAY DEVICE AND METHOD OF MANUFACTURING THE SAME

(75) Inventors: Kazuhiro Nakayama, Saitama-ken (JP); Kazunari Nishita, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 145 days.

(21) Appl. No.: 13/299,849

(22) Filed: Nov. 18, 2011

(65) Prior Publication Data
US 2012/0218494 A1   Aug. 30, 2012

(30) Foreign Application Priority Data

Feb. 25, 2011   (JP) .................................. 2011-040732

(51) Int. Cl.
*G02F 1/1333*   (2006.01)
(52) U.S. Cl.
USPC .......................................................... 349/60
(58) Field of Classification Search
USPC .......................................................... 349/60
See application file for complete search history.

(56) References Cited

U.S. PATENT DOCUMENTS

| 7,639,315 | B2 * | 12/2009 | Kao ................................ 349/58 |
| 8,235,572 | B2 * | 8/2012 | Hsu et al. ....................... 362/607 |
| 2008/0055517 | A1 * | 3/2008 | Yu ..................................... 349/65 |

FOREIGN PATENT DOCUMENTS

JP   2006-134180   5/2006

* cited by examiner

*Primary Examiner* — Timothy L Rude
(74) *Attorney, Agent, or Firm* — Oblon, Spivak, McClelland, Maier & Neustadt, L.L.P.

(57) ABSTRACT

In one embodiment, the liquid crystal display device includes a transmissive type liquid crystal display panel. A backlight unit is arranged on a back side of the liquid crystal display panel, and includes a light source portion for radiating the liquid crystal display panel with plane light. An optical sheet is arranged between the liquid crystal display panel and the back light unit. A rear bezel having a counter surface portion is arranged opposing at least a portion of a back side of the light source portion. An elastic sheet having a plurality of slits is arranged between the back side of the back light unit and the counter surface portion for elastically supporting the back light unit.

12 Claims, 2 Drawing Sheets

LIQUID CRYSTAL DISPLAY DEVICE AND METHOD OF MANUFACTURING THE SAME

CROSS-REFERENCE TO RELATED APPLICATION

This application is based upon and claims the benefit of priority from Japanese Patent Application No. 2011-040732, filed Feb. 25, 2011, the entire contents of which are incorporated herein by reference.

FIELD

Embodiments described herein relate generally to a liquid crystal display device and a method of manufacturing the same.

BACKGROUND

In recent years, many liquid crystal display devices equipped with a touch panel are on the market by the spread of the touch panels. Conventionally, a transmissive type liquid crystal device includes a liquid crystal panel, i.e., a transmissive type liquid crystal element, a light source, i.e., a back light unit for radiating the back side of the liquid crystal panel with a plane emission light, and an optical sheet arranged between the back light unit and the liquid crystal display panel. The liquid crystal panel and the back light unit are accommodated in a rear bezel as a container.

However, since a gap is produced between the rear bezel and the back side of the back light unit, the optical sheet of the back light unit bends by deformation of the touch panel when the touch panel is implemented in the liquid crystal display device, and a user touches the touch panel with a touch pen or a finger. Accordingly, there is a possibility that ripple-like display unevenness may arise in a display region of the liquid crystal panel.

Then, a structure is known to elastically support the back light unit. A cushion sheet formed of an elastic sheet is attached to the rear bezel, and the back light unit is elastically supported with the cushion sheet by filling the gap between the rear bezel and the back light unit.

However, in the above technique, when attaching the cushion sheet to the rear bezel, it has the problem that air easily enters between the rear bezel and the cushion sheet while forming an expanded portion therebetween. Thereby, ripple-like display unevenness may be caused in the expanded portion.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
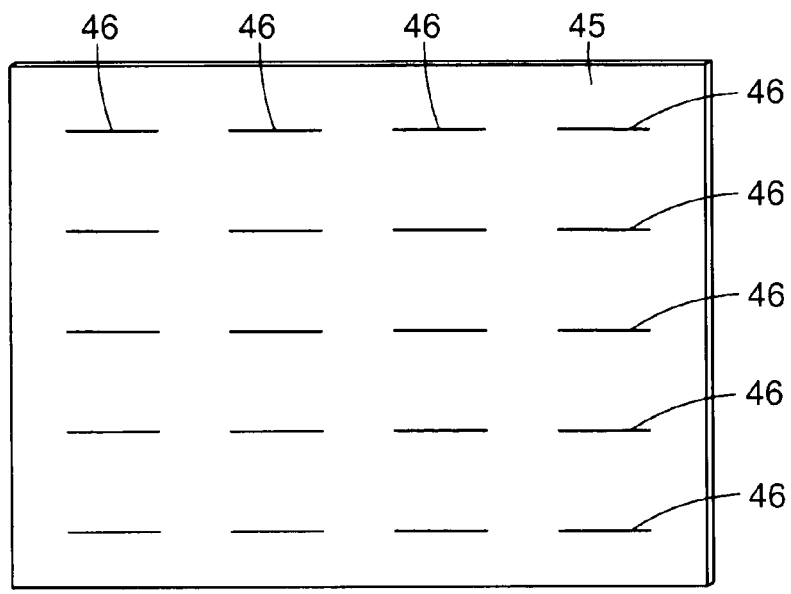
FIG. 1 is a perspective diagram showing an elastic sheet equipped in a liquid crystal display device according to one embodiment.

A liquid crystal display device and a method of manufacturing the same according to an exemplary embodiment of the present invention will now be described with reference to the accompanying drawings wherein the same or like reference numerals designate the same or corresponding portions throughout the several views.

According to one embodiment, a liquid crystal display device includes: a transmissive type liquid crystal display panel; a backlight unit arranged on a back side of the liquid crystal display panel and including a light source portion for radiating the liquid crystal display panel with plane light, and an optical sheet arranged between the liquid crystal display panel and the back light unit; a rear bezel having a counter surface portion opposing at least a portion of a back side of the backlight unit; and an elastic sheet having a plurality of slits for elastically supporting the back side of the backlight unit on the counter surface portion.

According to other embodiment, a liquid crystal display device includes: a transmissive type liquid crystal display panel; a backlight unit arranged at a back side of the liquid crystal display panel and including a light source portion for radiating the liquid crystal display panel with plane light and an optical sheet arranged between the liquid crystal display panel and the back light unit; a rear bezel having a counter surface portion opposing at least a portion of a back side of the light source portion; and an elastic sheet having a plurality of slits for elastically supporting the back side of the light source portion on the counter surface portion, the slits being intermittently formed in the elastic sheet; wherein the back light unit includes a light guide plate in a rectangular shape, and the light guide plate is arranged on the elastic sheet.

According to other embodiment, a method of manufacturing a liquid crystal display device includes the steps: preparing a back light unit for illuminating a liquid crystal display panel; preparing a bezel having a bottom surface portion; providing an elastic sheet on the bottom portion of the bezel for elastically supporting the backlight unit, the elastic sheet having a plurality of slits; exhausting air entering between the bottom surface portion and the elastic sheet through the slits by pressing an expanded portion due to the entered air while drawing to the slit gradually; elastically accommodating the back light unit in the bezel; and arranging the liquid crystal display panel on the backlight unit.

Hereafter, the structure according to one embodiment is explained with reference to FIG. 1 to FIG. 3.

Figure 3:
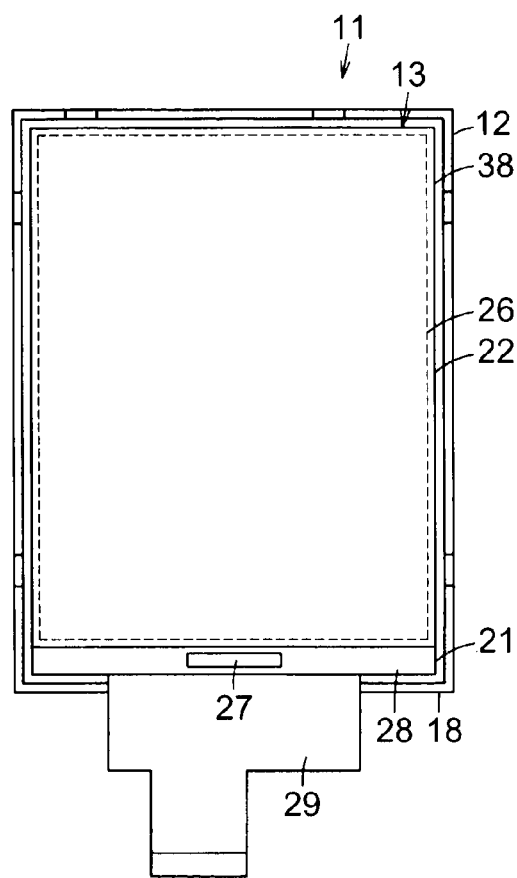
FIG. 3 is a plan view showing the liquid crystal display device according to the embodiment.
Figure 2:
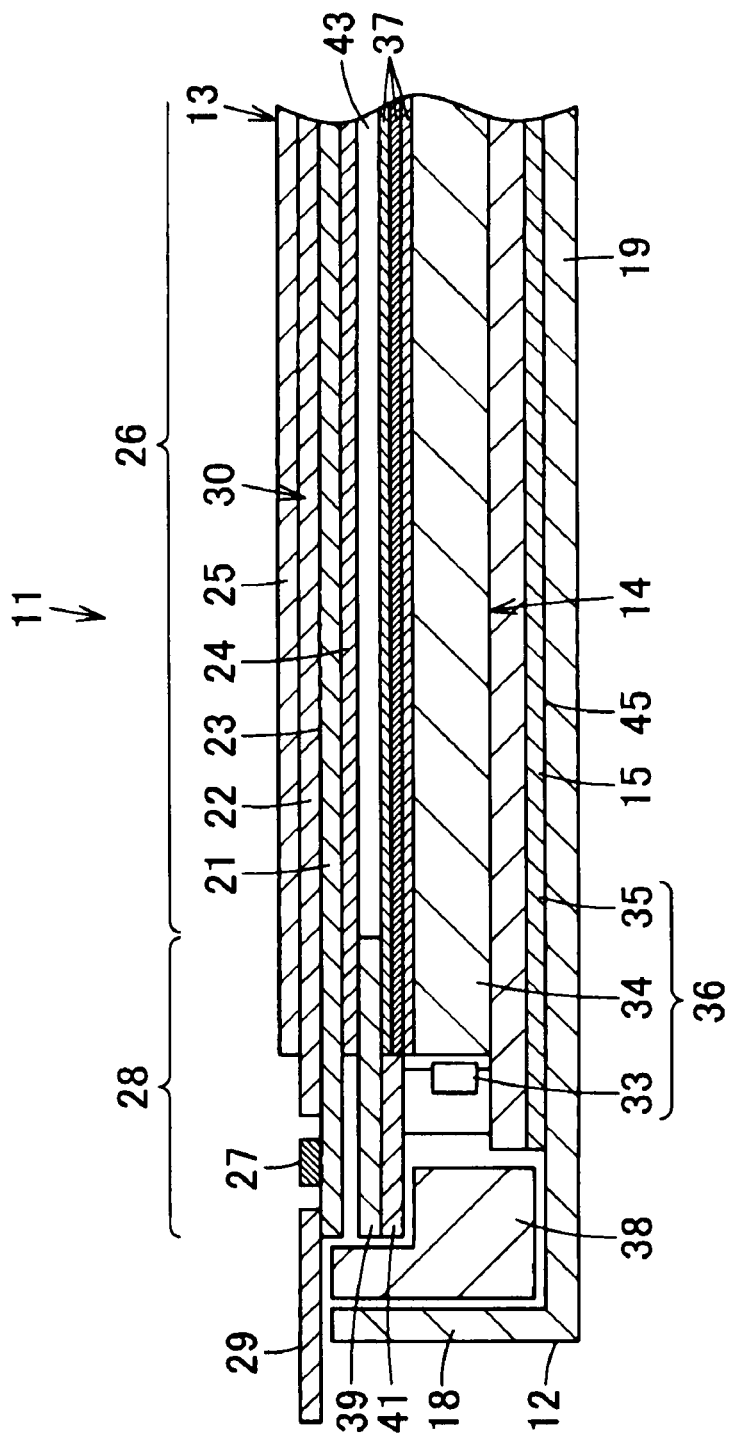
FIG. 2 is a cross-sectional view showing one portion of the liquid crystal display device according to the embodiment.

In FIG. 2 and FIG. 3, the liquid crystal display device 11 includes a liquid crystal display panel 13. The liquid crystal display panel 13 is accommodated as a liquid crystal display element in a rear bezel 12 with a back light unit 14 which is a light source unit, and a cushion sheet 15 which is an elastic sheet.

The rear bezel 12 is formed in the shape of a quadrangular box equipped with an outer wall portion 18 of the shape of a quadrangular frame surrounding a circumference of the liquid crystal panel 13 and the backlight unit 14, and a counter surface portion 19 which encloses the bottom of the outer wall portion 18. Although not illustrated, a quadrangular frame-like bezel cover is attached to the rear bezel 12, and the liquid crystal panel 13 and the back light unit 14 are accommodated in an inside of the rear bezel 12 so as to be held.

Moreover, the liquid crystal panel 13 is a transmissive type active matrix liquid crystal panel which penetrates a plane light from the back light unit 14, and displays an image. In the liquid crystal panel 13, a rectangular array substrate 21 and a rectangular counter substrate 22 as a displaying side are arranged opposing each other through a predetermined gap therebetween. Spacers which are not illustrated are provided to form the gap between the substrates. Liquid crystal materials are injected into the gap. Further, a polarizing plate 24 and a polarizing plate 25 are respectively attached to external surfaces i.e., on a back side of the array substrate 21 opposite to a contacting side with the liquid crystal layer 23, and on a displaying side of the counter substrate 22 opposite to a contacting side with the liquid crystal layer 23. Accordingly, an active area 26, i.e., a display region 26 in a square shape is formed, in which a plurality of pixels is arranged in the shape of a matrix to display images.

The array substrate 21 includes a glass substrate, a plurality of wiring portions formed in the shape of a lattice on the glass substrate corresponding to the display region 26, a pixel electrode formed on the glass substrate constituting a pixel, a thin film transistor (TFT), etc., which are switching elements for driving the pixel electrodes, respectively. Moreover, a driver IC 27 which is a drive circuit for driving each TFT is mounted in a non-display region 28 formed in the shape of a quadrangular frame outside the display region 26. The driver IC 27 may be mounted directly on the glass substrate. In addition, it is possible to mount the driver IC 27 on a different substrate, and then the different substrate may be connected with the glass substrate. Moreover, the driver IC 27 is electrically connected with an external circuit through a flexible substrate 29 electrically connected to the glass substrate in the non-displaying region 28. Furthermore, a touch-panel portion 30 for detecting a contact input operation from outside by input means, such as a finger and a pen, is constituted in the array substrate 21. The touch panel portion 30 can be constituted arbitrarily. For example, the touch panel portion 30 includes a sensor circuit for detecting the change of an electric capacitance by the contact (approach) on the display side of the liquid crystal panel 13 (upper side in FIG. 2), and for detecting a shadow, etc., of the input means projected by the contact (approach) of the input means on the display side of the liquid crystal panel 13 (which is not illustrated). The touch panel portion 30 further includes a sensor controlling circuit for performing various operations corresponding to the detected output from the sensor circuit.

Moreover, the counter substrate 22 has a glass substrate and a common counter electrode formed on the glass substrate. In addition, the common electrode may be formed on the array substrate 21 side. Furthermore, in case of a color display, the counter substrate 22 includes a color filter layer formed of red (R), green (G), blue (B) colored layers which can constitute at least white or black by mixed colors. The color filter layers may be formed on the array substrate 21 side.

As the liquid crystal layer 23, various modes, such as TN mode, STN mode, VA (MVA) mode, and IPS mode, can be used, for example.

Moreover, the polarizing plates 24 and 25 are formed of optical elements in the shape of a sheet, and are arranged so that a predetermined polarization ingredient of the light penetrates or is shut depending on the modes of the liquid crystal layer 13.

Moreover, the back light unit 14 includes a light source portion 36 constituted by a light source 33 formed of a plurality of LEDs which irradiate with white light, for example, and a light guide plate 34 in the shape of a rectangular plate for converting the luminescence from the light source 33 into the plane light, and a reflective sheet 35 arranged in piles on a back side (under side in FIG. 2) of the light guide plate 34 and adjacent to the light source 33. The back light unit 14 further includes singular number or a plurality of optical sheets 37 arranged in piles on the radiation side (upper side in FIG. 2) of the light guide plate 34, and a frame 38 for holding the light source portion 36 and the optical sheet 37. The back light unit 14 adjoins the liquid crystal panel 13 through the spacer 39 for preventing the liquid crystal panel 13 side from contacting with the optical sheet 37 while being supported by the counter surface portion 19 of the rear bezel 12 through the cushion sheet 15.

The light source portion 36 is supported by the frame 38 so that the light source 33 counters one side of the light guide plate 34, and the lightguide plate 34 counters the polarizing plate 24 on the back side of the liquid crystal panel 13.

The light source 33 is electrically connected to the flexible substrate 41 as an insulating substrate, and further to an external light source control circuit through the flexible substrate 41.

Moreover, the light guide plate 34 has an area narrower than the liquid crystal panel 13 while having the area larger than the display region 26 so that the whole region corresponding to the display region 26 of the liquid crystal panel 13 can be irradiated with the plane light at least.

Furthermore, the reflective sheet 35 prevents the leak of the unnecessary light by reflecting a portion of the luminescence from the light source 33 and the internal reflection light in the light guide plate 34, etc., and makes the luminescence from the light source 33 emit as the plane light from the lightguide plate 34 efficiently.

Moreover, the optical sheet 37 is formed of a condensing sheet or a diffusion sheet, for example, and gives a predetermined optical characteristics to the plane light which was converted by the light guide plate 34 of the light source portion 36, and the emitted light enters in the liquid crystal panel 13.

Moreover, the frame 38 is formed in the shape of a rectangular frame of the component with rigid characteristics, such as a synthetic resin, for example. The frame 38 is located in the inside of the rear bezel 12 and supported by the counter surface portion 19.

Moreover, the spacer 39 is arranged in a position corresponding to the non-displaying region 28 of the liquid crystal panel 13. That is, the spacer 39 is formed, for example, in the shape of a rectangular frame, and forms a gap 43 between the optical sheets 37 and the liquid crystal panel 13 side (polarizing plate 24) in the display region 26 of the liquid crystal panel 13.

Moreover, the cushion sheet 15 fills the gap between the counter surface portion 19 of the rear bezel 12 and the back side of a light guide plate 34 of the back light unit 14. The cushion sheet 15 includes a plurality of slits 46 formed in a rectangular main sheet portion 45 so as to penetrate in its thickness direction as shown in FIG. 1. The slit 46 is formed in the shape of a straight line along one end of the main sheet portion 45, that is, in the longitude direction, for example. The plurality of slits 46 are arranged in the lateral direction in a line forming a row line of a perforated line apart from each other, and the row lines are arranged in a vertical direction apart from each other. That is, the slits 46 are formed intermittently in the main sheet 45 so as to form a predetermined interval between one end portion of one slit 46 and another end portion of another slit 46 respectively, that is, the slits 46 are formed in the plurality of places in the intermittent shape.

Next, the manufacturing method of the above embodiment is explained.

When assembling the liquid crystal display device 11, firstly, the back light unit 14 and the liquid crystal panel 13 are assembled beforehand.

The back light unit 14 is formed by attaching the reflective sheet 35 and the optical sheet 37 respectively, while building the light source 33 and the lightguide plate 34 electrically connected with the flexible substrate 41 into the frame 38 one by one.

Moreover, the liquid crystal panel 13 is formed by attaching a mother glass substrate in which the plurality of array substrates 21 are formed, and a mother glass substrate in which the plurality of counter substrates 22 are formed. The both substrates are attached through a liquid crystal layer 23 and divided into respective liquid crystal panels 13. The polarizing plates 24 and 25 are attached on the external surfaces of the liquid crystal panel 13, respectively.

The back light unit 14 and the liquid crystal panel 13 are attached together by the spacer 39, while a position alignment is made therebetween.

Subsequently, the cushion sheet 15 is attached to the counter surface portion 19 of the rear bezel 12. In this time, the cushion sheet 15 is attached precisely to the counter surface portion 19 without generating concavity and convexity, i.e., expansion by exhausting the air which entered between the cushion sheet 15 and the counter surface portion 19 through each slit 46. Further, even if the unevenness (swelling) remains, the unevenness is easily removed by pressing the concavity and convexity while drawing to the slit 46 because the air is exhausted by being moved to the slit 46 gradually.

Then, the back light unit 14 and the liquid crystal panel 13 unitized each other are inserted in the rear bezel 12, and fixed on the reflective sheet 35 attached to the cushion sheet 15. Alternately, the back light unit 14 may be attached to the rear bezel 12 in advance, then the liquid crystal panel 13 may be attached to the back light unit 14 through the spacer 39.

Moreover, the flexible substrate 29 of the array substrate 21 and the flexible substrate 41 of the light source 33 are electrically connected with exterior devices, respectively.

In the completed liquid crystal display device 11, each TFT drives the respective pixel electrodes by the signal corresponding to the images to be displayed and supplied from the driver IC 27 through the wiring portion, and a desired image is displayed on the display region 26.

Moreover, in the touch-panel portion 30, a user's external input operation is detected by detecting a position coordinate with which the user's finger or pen contacts.

Then, the liquid crystal display device 11 performs various processes based on a correspondence with the position coordinate of the input means detected in the touch panel portion 30 and the image displayed in the display region 26. Practically, the liquid crystal display device 11 displays a plurality of buttons which indicate various processes, for example, on the liquid crystal panel 13. The process displayed on the button is performed by detecting which button the user operated, in detail, by calculating the relationship between the position of the buttons and the contacted position of the input means in the touch-panel portion 30.

Thus, according to this embodiment, when attaching the cushion sheet 15 to the counter surface portion 19, the air which enters between the counter surface portion 19 and the main sheet portion 45 of the cushion sheet 15 can be exhausted through the slits 46 formed in the cushion sheet 15 which elastically supports the back side of the light source portion 36 on the counter surface portion 19 of the rear bezel 12. Therefore, the cushion sheet 15 can be attached meeting with the counter surface portion 19 in the flat state without generating unevenness resulting from the entered air. Even when external force is applied to the display side of the liquid crystal panel 13, this external force is absorbed by the elastic deformation of the cushion sheet 15 through the spacer 39 and the back light unit 14, and the deformation of the optical sheet 37 can be controlled. As a result, it can be suppressed that the deformation of the optical sheet 37 is generated by the external force applied to the display side of the liquid crystal panel 13, and that the ripple-like display unevenness is formed in the display region 26 of the liquid crystal panel 13.

In the case of the liquid crystal display device 11 especially equipped with the touch-panel portion 30, the display side of the liquid crystal panel 13 is pressed when the user performs the input operation using input means, such as a finger and a pen. However, in the liquid crystal display device 11 with the touch-panel portion 30, it can be suppressed certainly using the cushion sheet 15 that the ripple-like unevenness arises in the display region 26 by such pressure.

Moreover, even if air enters between the counter surface portion 19 and the main sheet portion 45 of the cushion sheet 15, the air can be more easily exhausted from each slit 46 when attaching the cushion sheet 15 with the counter surface portion 19 of the rear bezel 12 by forming the plurality of slits 46 in the cushion sheet 15.

In addition, in the above-mentioned embodiment, the slits 46 can be formed in the shape of a straight line, for example, along the vertical direction of the main portion 45 of the cushion sheet 15, or formed in the shape of a circle, or in the shape of an arbitrary curve, etc., that is, in the arbitrary positions of the main portion 45 of the cushion sheet 15 and in arbitrary forms.

Moreover, the touch-panel portion 30 is not only implemented in the liquid crystal panel 13 but is formed as one part of the liquid crystal panel 13. Even if the touch panel portion may be attached on the surface of the polalizing plate 25 of the liquid crystal panel 13 through an attaching element with sealing characteristics without a gap, the same effect can be obtained. In this case, as the touch-panel portion, various types, such as an electric capacitance type, a resistance type, and a resistance film type, can be used, for example.

Furthermore, the liquid crystal display device 11 without the touch-panel portion 30 can perform the same effect as the above embodiment equipped with the touch-panel portion 30.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope and spirit of the inventions.

What is claimed is:

1. A liquid crystal display device, comprising:
a transmissive type liquid crystal display panel;
a backlight unit arranged on a back side of the liquid crystal display panel and including a light source portion for radiating the liquid crystal display panel with plane light, and an optical sheet arranged between the liquid crystal display panel and the back light unit;
a rear bezel having a counter surface portion opposing at least a portion of a back side of the backlight unit; and
an elastic sheet having a plurality of slits for elastically supporting the back side of the backlight unit on the counter surface portion.

2. The liquid crystal display device according to claim 1, wherein the slits are formed in the shape of a circle or an arbitrary curve.

3. The liquid crystal display device according to claim 1, wherein the slits are intermittently formed in the elastic sheet.

4. The liquid crystal display device according to claim 1, wherein the liquid crystal display device further comprising a touch panel portion for detecting an input operation from external.

5. A method of manufacturing a liquid crystal display device comprising the steps:
preparing a back light unit for illuminating a liquid crystal display panel;
preparing a bezel having a bottom surface portion;
providing an elastic sheet on the bottom portion of the bezel for elastically supporting the backlight unit, the elastic sheet having a plurality of slits;
exhausting air entering between the bottom surface portion and the elastic sheet through the slits by pressing an expanded portion due to the entered air while drawing to the slit gradually;
elastically accommodating the back light unit in the bezel; and
arranging the liquid crystal display panel on the backlight unit.

6. The method for manufacturing a liquid crystal display device according to claim 5 further comprising the step for arranging a touch panel portion on the liquid crystal display panel.

7. The method for manufacturing a liquid crystal display device according to claim 5, wherein the slits are formed in the shape of a circle or an arbitrary curve.

8. A liquid crystal display device, comprising:
a transmissive type liquid crystal display panel;
a backlight unit arranged at a back side of the liquid crystal display panel and including a light source portion for radiating the liquid crystal display panel with plane light and an optical sheet arranged between the liquid crystal display panel and the back light unit;
a rear bezel having a counter surface portion opposing at least a portion of a back side of the light source portion;
an elastic sheet having a plurality of slits for elastically supporting the back side of the light source portion on the counter surface portion, the slits being intermittently formed in the elastic sheet; and
wherein the back light unit includes a light guide plate in a rectangular shape, and the light guide plate is arranged on the elastic sheet.

9. The liquid crystal display device according to claim 8, wherein the slits are formed in the shape of a circle or an arbitrary curve.

10. The liquid crystal display device according to claim 8, wherein the liquid crystal display device further comprising a touch panel portion arranged on the liquid crystal display panel for detecting an input operation from external.

11. The liquid crystal display device according to claim 10, wherein the touch panel portion adopts one of an electric capacitance type, a resistance type, and a resistance film type.

12. The liquid crystal display device according to claim 10, wherein a spacer is arranged between the liquid crystal display panel and the back light unit.

* * * * *